(12) United States Patent
McCloskey

(10) Patent No.: US 9,424,411 B2
(45) Date of Patent: Aug. 23, 2016

(54) ATHENTICATION OF DEVICE USERS BY GAZE

(71) Applicant: Honeywell International Inc., Morristown, NJ (US)

(72) Inventor: Scott McCloskey, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/247,922

(22) Filed: Apr. 8, 2014

(65) Prior Publication Data

US 2014/0351926 A1    Nov. 27, 2014

Related U.S. Application Data

(60) Provisional application No. 61/826,721, filed on May 23, 2013.

(51) Int. Cl.
*G06F 21/32* (2013.01)
*G06F 21/31* (2013.01)

(52) U.S. Cl.
CPC .............. *G06F 21/316* (2013.01); *G06F 21/32* (2013.01); *G06F 2221/2105* (2013.01); *G06F 2221/2141* (2013.01); *G06F 2221/2147* (2013.01)

(58) Field of Classification Search
CPC ....... G06F 21/32; G06F 3/013; G06F 21/316; G06F 2221/2147; G06F 2221/2105; G06F 2221/2141
USPC ............................................ 713/186; 726/19
See application file for complete search history.

(56) References Cited

U.S. PATENT DOCUMENTS

| 7,881,493 | B1* | 2/2011 | Edwards | G06K 9/00597 348/78 |
|---|---|---|---|---|
| 8,988,350 | B2* | 3/2015 | Karmarkar | G06F 3/013 345/158 |
| 2003/0135740 | A1* | 7/2003 | Talmor | G06F 21/32 713/186 |
| 2006/0210122 | A1* | 9/2006 | Cleveland | A61B 3/107 382/117 |
| 2007/0078526 | A1* | 4/2007 | Bromley | G05B 19/0423 700/19 |
| 2008/0065468 | A1* | 3/2008 | Berg | G06Q 30/0203 705/7.32 |
| 2010/0310133 | A1* | 12/2010 | Mason | A61B 5/117 382/117 |
| 2012/0204259 | A1* | 8/2012 | Nakamura | G06F 21/32 726/19 |
| 2013/0044055 | A1 | 2/2013 | Karmarkar et al. | |

OTHER PUBLICATIONS

Deravi, Farzin, and Guness, S.P. (2001) Gaze Trajectory as a Biometric Modality. Biosignals 2011, Jan. 2011 Rome, Italy.*

(Continued)

*Primary Examiner* — Jung Kim
*Assistant Examiner* — Thomas Ho
(74) *Attorney, Agent, or Firm* — Schwegman Lundberg & Woessner, P.A.

(57) ABSTRACT

A method includes obtaining a gaze feature of a user of a device, wherein the device has already been unlocked using a second feature, the gaze feature being based on images of a pupil relative to a display screen of the device, comparing the obtained gaze feature to known gaze features of an authorized user of the device, and determining whether or not the user is authorized to use the device based on the comparison.

18 Claims, 2 Drawing Sheets

(56) References Cited

OTHER PUBLICATIONS

Deravi, Farzin and Guness, S.P. (2011) Gaze Trajectory as a Biometric Modality. In: Biosignals 2011, Jan. 2011, Rome, Italy.*

Chen, Brian X, "Samsung's New Smartphone Will Track Eyes to Scroll Pages", [Online]. Retrieved from the Internet: <URL: http://bits.blogs.nytimes.com/2013/03/04/samsungs-new-smartphone-will-track-eyes-to-scroll-pages/>, (Mar. 4, 2013), 2 pgs.

* cited by examiner

ATHENTICATION OF DEVICE USERS BY GAZE

RELATED APPLICATION

This application claims priority to U.S. Provisional Application Ser. No. 61/826,721 (entitled AUTHENTICATION OF MOBILE PHONE USERS BY GAZE, filed May 17, 2013) which is incorporated herein by reference.

BACKGROUND

With the increasing use of smartphones and tablets by large corporations and defense agencies, there is increasing concern about the security of such devices. The US Department of Defense, in particular, is interested in actively authenticating mobile device users. This desire arises in part because of the ineffectiveness of passwords and in part because the device may change hands after the rightful owner has unlocked it. There is a need, then, to authenticate the user of a mobile device as it is being used for its intended purpose.

In one prior device, a user may unlock a phone by gazing at images in a specified sequence. The device is unlocked when eye tracking data matches expected eye tracking data. One prior device purports to track a user's eyes to determine where to scroll. When a user reads text, and eye tracking indicates the last text on the page has been read, the next page of text may be automatically displayed.

SUMMARY

A method includes obtaining a gaze feature of a user of a device, wherein the device has already been unlocked using a second feature, the gaze feature being based on images of a pupil relative to a display screen of the device, comparing the obtained gaze feature to known gaze features of an authorized user of the device, and determining whether or not the user is authorized to use the device based on the comparison.

The method may also be implemented via code stored on a computer readable storage device.

In a further embodiment, a system includes a wireless communications capable device having a processor, a memory, and a display screen, a camera supported by the device and facing toward a user of the device to provide video of a user's pupil to the processor, programming stored on the memory, the programming adapted to cause the processor to identify a gaze feature of the user, compare the identified gaze feature of the user to known gaze features of the user, and confirming whether or not the user is the user that is authorized and has passed a separate security check to use the device.

DETAILED DESCRIPTION

Figure 1:
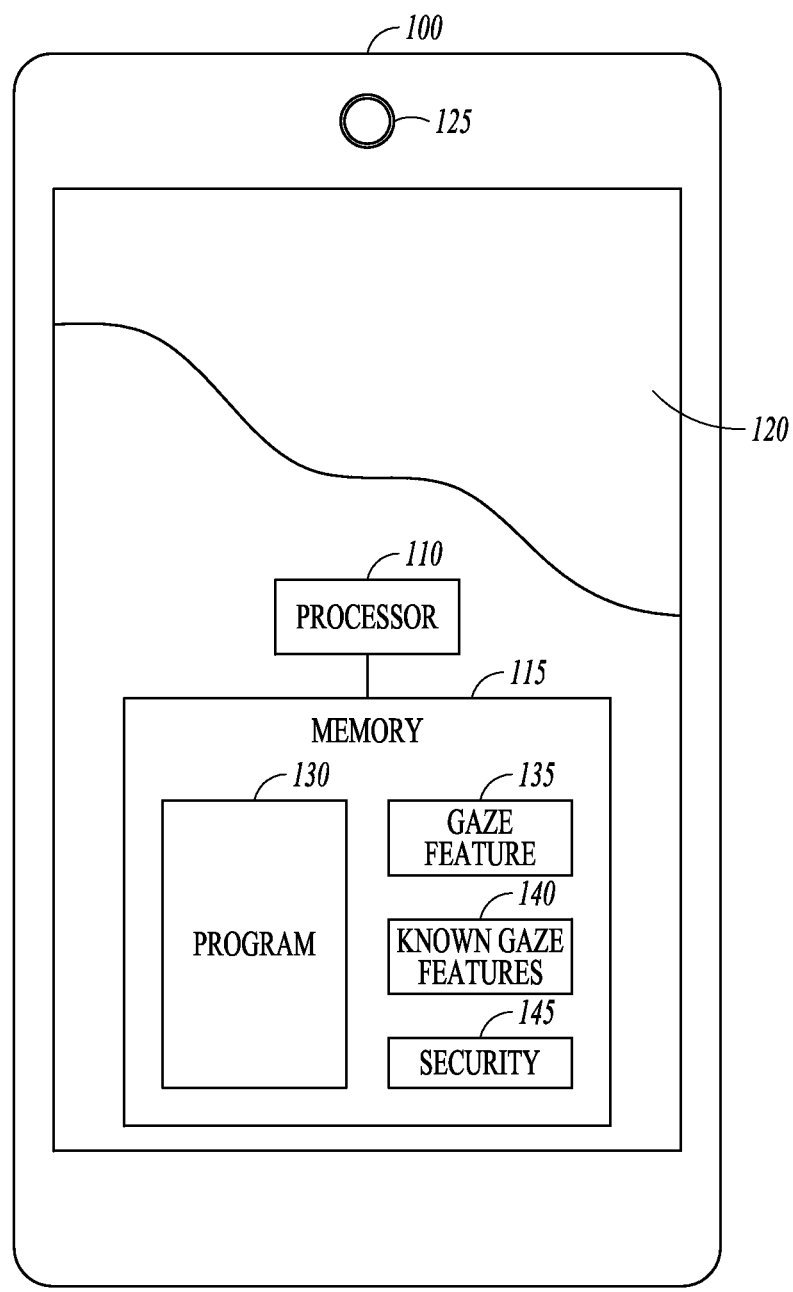
FIG. 1 is a block diagram of a system using gaze information to authenticate a user according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A front facing camera is among the sensors available on typical hand held devices, such as smartphones and tablets. While the front facing camera is used today for authentication, such as a "face unlock" feature, such an unlock feature is not applied in an active way while a device is already unlocked and in active use.

Once the phone is unlocked, there is no ongoing authentication. Moreover, face recognition has issues dealing with non-uniform illumination and may not handle appearance variations of the same person (say, a Halloween costume).

In order to address these issues, various embodiments actively authenticate a mobile device user based on their gaze patterns, as observed by the front-facing camera, proximity sensor or wave sensor. Other sensors may also be used in further embodiments, and may utilize lower power than a camera. Visual attention differs as a function of the viewer's expertise in understanding what they are looking at. Given that mobile devices can be customized by the owner, other users can be thought of as lacking expertise in understanding the device. The other user may not know where desired icons are located, or whether needed apps are installed on the device. As such, the rightful owner of a mobile device should be more efficient than a non-owner, who may spend quite a bit more time scanning the display in search of a desired icon.

One embodiment includes software running on the mobile device. Images from the front-facing camera or other sensor are recorded, eye tracking is applied, and the recorded history of eye position as a function of time is used as input to a verification module which returns a positive result when the eye motions are consistent with the owner's behavior, and a negative result when eye motions are inconsistent. In other embodiments, eye position data may be recorded from ancillary sensors which are designed to capture gaze information with lower power consumption.

In one embodiment, adequate performance may be achieved by direct classification on the motion pattern. Further embodiments may utilize extraction of features (locations of inflection points, etc.) may be a more successful method. In addition, temporal segmentation may be applied to the eye motion history. By first de-composing the motion sequence into periods of known behavior (fixating, scanning, etc.), histogram-type features may be generated against which a machine learning model (SVM, etc.) may be applied.

By tracking eye motions over time and correlating the motions to the context of user interaction with a display, including selection of features, multiple features may be extracted. Example features include length of time looking at a point on the display screen, scanning speed and duration while reading text or identifying the location of appearance of a feature selected by the user, anticipation of where a feature will occur—referred to as anticipatory gaze, and a multitude of other features.

Anticipatory gaze for example may include the time from a click or selection of a feature to the time the user focuses on a point where the feature will materialize on the display screen. The time may be negative if the user looks prior to the appearance of the feature, or may be positive if the user appears to spend time looking for the feature after it appears. Still further features include a trajectory of the gaze, and various statistics regarding gaze, such as standard deviation of a horizontal gaze, reading speeds, and various other statistics on when users look at different portions of the display screen.

The gaze pattern comparisons may be utilized in conjunction with other security features, such as speaker recognition, how a phone is being held, passwords, and other biometric security features may be used. The gaze pattern comparisons may be used after the user has already gained access to the phone or other device using the other one or more security features.

FIG. 1 is a block diagram of a device 100 having a processor 110, a memory 115, and a display screen 120 shown in cut away. The device may be a mobile device such as a smart phone, a laptop computer, a desktop computer or other computing device. A gaze sensor 125 is supported by the device 100 and facing toward a user of the device 100 to provide gaze tracking information to the processor 110. The gaze sensor 125 may be a camera in some embodiments. Programming 130 is stored on the memory 115. The programming 130 is adapted to cause the processor 110 to identify a gaze feature 135 of the user, compare the identified gaze feature of the user to known gaze features 140 of the user, and confirm whether or not the user is the user that is authorized and has passed a separate security check 145 to use the device 100.

In one embodiment, the gaze feature comprises a length of time looking at a portion of the display screen, or alternatively a speed and duration of scanning. In a further embodiment, the gaze feature comprise an anticipatory gaze of the user, which may include a length of time from a user selecting a function to the time a user gazes in a proper location where a feature will appear. The length of time is negative if the user gazes in the proper location prior to the feature appearing and positive if the user gazes in the proper location after the feature appears. The gaze feature may also include a standard deviation of a horizontal gaze. In still further embodiments the gaze features comprises reading speed.

Figure 2:
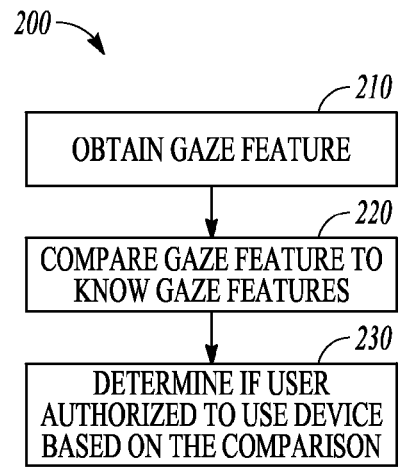
FIG. 2 is a flowchart illustrating a method 200 of authenticating a user as a function gaze information according to an example embodiment.

FIG. 2 illustrates a method 200 of authenticating a user using gaze tracking. The method 200 starts by obtaining, at 210, a gaze feature of a user of a device after the device has already been unlocked using a second feature. The gaze feature may be based on gaze tracking information relative to a display screen of the device. At 220, the obtained gaze feature is compared to known gaze features of an authorized user of the device. At 230, method 200 determines whether or not the user is authorized to use the device based on the comparison.

In one embodiment, multiple gaze features are obtained and compared on which to base the determination 230. The gaze feature may include one or more of a length of time looking at a portion of the display screen, a speed and duration of scanning, and an anticipatory gaze of the user. The anticipatory gaze feature may include a length of time from a user selecting a function to the time a user gazes in a proper location where a feature will appear. The length of time is negative if the user gazes in the proper location prior to the feature appearing and positive if the user gazes in the proper location after the feature appears.

In a further embodiment, the gaze feature comprises a standard deviation of a horizontal gaze. The gaze feature may also include a reading speed. The reading speed may be derived from analyzing the gaze with respect to a number of words read during a known time period.

In yet further embodiments, the method 200 may be implemented in programming on a computer readable storage device when read and executed by processing circuitry.

Figure 3:
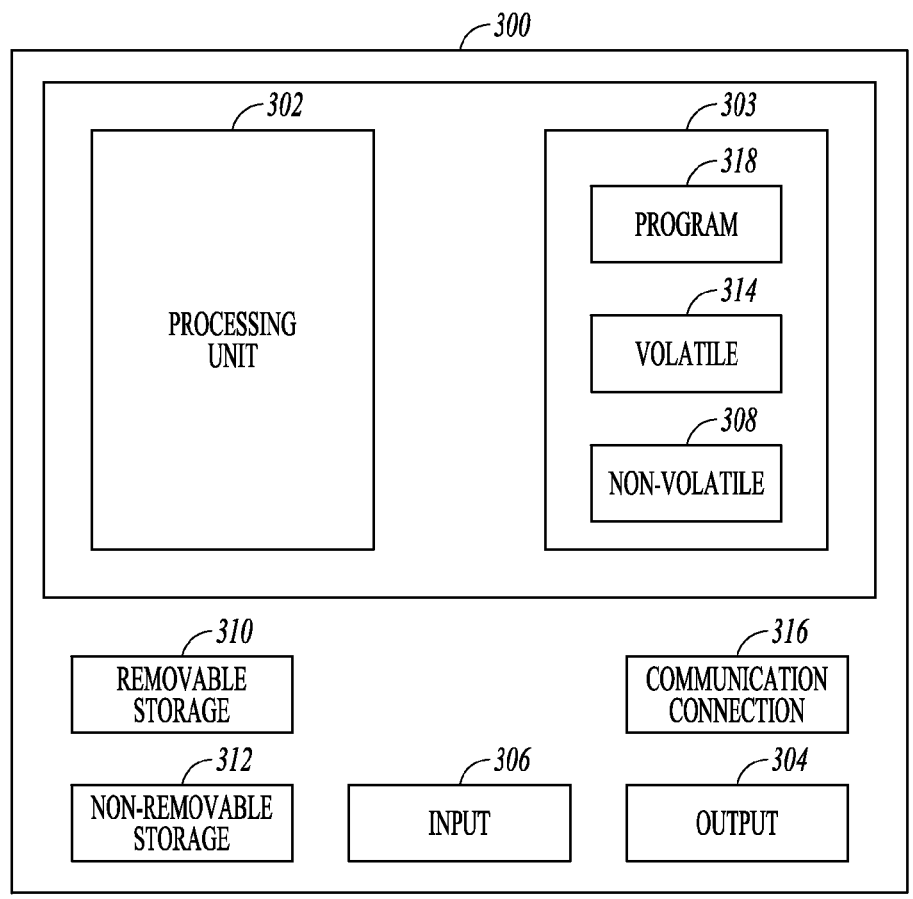
FIG. 3 is a block diagram of a computer system for implementing one or more methods according to example embodiments.

FIG. 3 is a block schematic diagram of a computer system 300 to implement a controller according to an example embodiment. The computer system 300 may be a smart phone, tablet, personal computer, wearable smart device, desktop computer or other computing device in various embodiments. While many components are shown, different computing devices may include only a subset of the components in some embodiments.

One example computing device in the form of a computer 300, may include a processing unit 302, memory 303, removable storage 310, and non-removable storage 312. Memory 303 may include volatile memory 314 and non-volatile memory 308. Computer 300 may include—or have access to a computing environment that includes—a variety of computer-readable media, such as volatile memory 314 and non-volatile memory 308, removable storage 310 and non-removable storage 312. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 300 may include or have access to a computing environment that includes input 306, output 304, and a communication connection 316. In the case of computer 300 being a wireless mobile device, the output 304 may include a touchscreen, which may also operate as an input device. The input 306 may also include a gaze tracking sensor, such as a camera. Communication connection 316 may include a transceiver suitable for mobile communications, such as cellular networks, local area networks and wide area networks, as well as hardwired connections. The computer may operate in a networked environment using a communication connection to connect to one or more remote computers, such as database servers.

Computer-readable instructions stored on a computer-readable medium are executable by the processing unit 302 of the computer 300. A hard drive, CD-ROM, and RAM are some examples of articles including a non-transitory computer-readable medium. For example, a computer program 318 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 300 to provide generic access controls in a COM based computer network system having multiple users and servers.

EXAMPLES

1. A system comprising:
a device having a processor, a memory, and a display screen;
a gaze sensor supported by the device and facing toward a user of the device to provide gaze tracking information to the processor;
programming stored on the memory, the programming adapted to cause the processor to:
identify a gaze feature of the user;
compare the identified gaze feature of the user to known gaze features of the user; and
confirming whether or not the user is the user that is authorized and has passed a separate security check to use the device.

2. The system of example 1 wherein the gaze feature comprises a length of time looking at a portion of the display screen.

3. The system of example 1 wherein the gaze feature comprises a speed and duration of scanning.

4. The system of example 1 wherein the gaze feature comprise an anticipatory gaze of the user.

5. The system of example 4 wherein the anticipatory gaze feature includes a length of time from a user selecting a function to the time a user gazes in a proper location where a feature will appear.

6. The system of example 5 wherein the length of time is negative if the user gazes in the proper location prior to the feature appearing and positive if the user gazes in the proper location after the feature appears.

7. The system of example 1 wherein the gaze feature comprises a standard deviation of a horizontal gaze.

8. The system of example 1 wherein the gaze features comprises reading speed.

9. A method comprising:
obtaining a gaze feature of a user of a device, wherein the device has already been unlocked using a second feature, the gaze feature being based on gaze tracking information relative to a display screen of the device;
comparing the obtained gaze feature to known gaze features of an authorized user of the device; and
determining whether or not the user is authorized to use the device based on the comparison.

10. The method of example 9 wherein multiple gaze features are obtained and compared on which to base the determination.

11. The method of example 9 wherein the gaze feature comprises a length of time looking at a portion of the display screen.

12. The method of example 9 wherein the gaze feature comprises a speed and duration of scanning.

13. The method of example 9 wherein the gaze feature comprise an anticipatory gaze of the user.

14. The method of example 13 wherein the anticipatory gaze feature includes a length of time from a user selecting a function to the time a user gazes in a proper location where a feature will appear.

15. The method of example 14 wherein the length of time is negative if the user gazes in the proper location prior to the feature appearing and positive if the user gazes in the proper location after the feature appears.

16. The method of example 9 wherein the gaze feature comprises a standard deviation of a horizontal gaze.

17. The method of example 9 wherein the gaze features comprises reading speed.

18. A computer readable storage device having instructions to cause a processor to perform a method, the method comprising:
obtaining a gaze feature of a user of a device, wherein the device has already been unlocked using a second feature, the gaze feature being based gaze tracking information relative to a display screen of the device;
comparing the obtained gaze feature to known gaze features of an authorized user of the device; and
determining whether or not the user is authorized to use the device based on the comparison.

19. The computer readable storage device of example 18 wherein multiple gaze features are obtained and compared on which to base the determination.

20. The computer readable storage device of example 18 wherein the gaze feature comprises a length of time looking at a portion of the display screen.

21. The computer readable storage device of example 18 wherein the gaze feature comprises a speed and duration of scanning.

22. The computer readable storage device of example 18 wherein the gaze feature comprise an anticipatory gaze of the user.

23. The computer readable storage device of example 22 wherein the anticipatory gaze feature includes a length of time from a user selecting a function to the time a user gazes in a proper location where a feature will appear.

24. The computer readable storage device of example 23 wherein the length of time is negative if the user gazes in the proper location prior to the feature appearing and positive if the user gazes in the proper location after the feature appears.

25. The computer readable storage device of example 18 wherein the gaze feature comprises a standard deviation of a horizontal gaze.

26. The computer readable storage device of example 18 wherein the gaze features comprises reading speed.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A system comprising:
a device having a processor, a memory, and a display screen;
a gaze sensor supported by the device and facing toward a user of the device to provide gaze tracking information to the processor;
programming stored on the memory, the programming adapted to cause the processor to:
identify at least one gaze feature of the user, the at least one gaze feature including a length of time from a user selecting a function to the time a user gazes at a location on the display screen where a feature will appear;
compare the identified gaze feature of the user to known gaze features of a user that is authorized and has passed a separate security check to use the device; and
confirm whether or not the user is the user that is authorized and has passed a separate security check to use the device.

2. The system of claim 1 wherein the at least one gaze feature comprises a length of time looking at a portion of the display screen.

3. The system of claim 1 wherein the at least one gaze feature comprises a speed and duration of scanning.

4. The system of claim 1 wherein the length of time is negative.

5. The system of claim 1 wherein the at least one gaze feature comprises a standard deviation of a horizontal gaze.

6. The system of claim 1 wherein the at least one gaze features comprises a reading speed detector that derives reading speed from analyzing the gaze.

7. A method comprising:
  obtaining a gaze feature of a user of a device, wherein the device has already been unlocked using a second feature, the gaze feature being based on gaze tracking information relative to a display screen of the device, the gaze feature including a length of time from a user selecting a function to the time a user gazes at a location on the display screen where a feature will appear;
  comparing the obtained gaze feature to known gaze features of an authorized user of the device; and
  determining whether or not the user is authorized to use the device based on the comparison.

8. The method of claim 7 wherein multiple gaze features are obtained and compared on which to base the determination.

9. The method of claim 7 wherein the gaze feature comprises a length of time looking at a portion of the display screen.

10. The method of claim 7 wherein the gaze feature comprises a speed and duration of scanning.

11. The method of claim 7 wherein the length of time is negative.

12. The method of claim 7 wherein the gaze feature comprises a standard deviation of a horizontal gaze.

13. The method of claim 7 wherein the gaze feature comprises reading speed.

14. A computer readable storage device having instructions to cause a processor to perform a method, the method comprising:
  obtaining a gaze feature of a user of a device, wherein the device has already been unlocked using a second feature, the gaze feature being based on gaze tracking information relative to a display screen of the device, the gaze feature including a length of time from a user selecting a function to the time a user gazes at a location on the display screen where a feature will appear;
  comparing the obtained gaze feature to known gaze features of an authorized user of the device; and
  determining whether or not the user is authorized to use the device based on the comparison.

15. The computer readable storage device of claim 14 wherein multiple gaze features are obtained and compared on which to base the determination.

16. The computer readable storage device of claim 14 wherein the gaze feature comprises a length of time looking at a portion of the display screen.

17. The computer readable storage device of claim 14 wherein the gaze feature comprises a speed and duration of scanning.

18. The computer readable storage device of claim 14 wherein the length of time from a user selecting a function to the time a user gazes at a location on the display screen where a feature will appear is negative, indicating that the user gazed in the location where the feature will appear before it appeared.

* * * * *